US012709033B2

(12) United States Patent
Holtz et al.

(10) Patent No.: US 12,709,033 B2
(45) Date of Patent: Aug. 18, 2026

(54) HANDHELD CUTTING TOOL

(71) Applicants: Luke Holtz, Patton, PA (US); Logan Ivory, Ashville, PA (US)

(72) Inventors: Luke Holtz, Patton, PA (US); Logan Ivory, Ashville, PA (US)

( * ) Notice: Subject to any disclaimer, the term of this patent is extended or adjusted under 35 U.S.C. 154(b) by 360 days.

(21) Appl. No.: 18/507,599

(22) Filed: Nov. 13, 2023

(65) Prior Publication Data

US 2025/0153375 A1 May 15, 2025

(51) Int. Cl.
*B26B 5/00* (2006.01)

(52) U.S. Cl.
CPC .............. *B26B 5/005* (2013.01); *B26B 5/003* (2013.01)

(58) Field of Classification Search
USPC .............................................. 30/2, 286, 294
See application file for complete search history.

(56) References Cited

U.S. PATENT DOCUMENTS 2,018,149 A * 10/1935 Randle .................. B26B 27/005 30/294
3,893,238 A * 7/1975 Scholl ................ A47G 27/0487 30/294
6,671,968 B2 * 1/2004 Shannon ................. B26B 29/06 30/294
6,880,250 B1 * 4/2005 Tamez ................... B43M 7/007 30/162
9,650,065 B2 * 5/2017 Davis ......................... B26B 3/08
10,773,370 B1 * 9/2020 Warzecha .............. B25G 1/102
12,290,949 B1 * 5/2025 Abrams .................. B26B 5/005
2019/0224861 A1 * 7/2019 Bloch ...................... B26B 5/001
2024/0001570 A1 * 1/2024 Dovel ...................... B26B 5/001
2025/0153375 A1 * 5/2025 Holtz .................... B26B 27/005

OTHER PUBLICATIONS

SLICE: Auto-Retractable Box Cutter with SLICE® Ceramic Blade SKU# 10503, 1 page [retrieved online Dec. 26, 2023] URL: https://cdn.shopify.com/s/files/1/0635/4468/8866/files/10503_sell_sheet.pdf?v=8854639556753684794 (2020).
SLICE: Auto-Retractable Utility Scraper with SLICER® Ceramic Blade, SKU# 10593, 1 page [retrieved online Dec. 26, 2023] URL: https://cdn.shopify.com/s/files/1/0635/4468/8866/files/10593_sell_sheet_20200617.pdf?v=11836677835214490122 (2020).

* cited by examiner

*Primary Examiner* — Hwei-Siu C Payer
(74) *Attorney, Agent, or Firm* — COOLEY LLP

(57) ABSTRACT

According to an embodiment, an apparatus includes a body having a first surface and a second surface, the first surface having a surface area greater than an area of a cross section normal to the first surface, the body defining an aperture that defines a normal axis substantially normal to the first surface and the second surface. The apparatus also includes an actuator assembly magnetically coupled to the body, at least a portion of the actuator assembly being disposed within the aperture. The apparatus also includes a cutting member coupled to the actuator assembly and having (1) a surface substantially normal to the first surface and (2) a cutting edge configured to be disposed (a) between the first surface and the second surface while the actuator assembly is in the storage configuration and (b) beyond the first surface while the actuator assembly is in the cutting configuration.

20 Claims, 14 Drawing Sheets

$$w_{avg} = \frac{w_1 + w_2 + w_3 + w_4 + w_5 + w_6 + \cdots w_n}{n}$$

HANDHELD CUTTING TOOL

FIELD

One or more embodiments described herein relate to cutting apparatuses and, in particular, handheld cutting tools for cutting materials.

BACKGROUND

Some known utility knives can be difficult to hold, cause injury, or be easily misplaced. Thus, there is a need for an improved utility tool.

SUMMARY

According to an embodiment, an apparatus includes a body including a first surface and a second surface. The first surface is substantially planar, is disposed an average distance t from the second surface, and has an average length l and an average width w. The average length/is greater than the average width w, and the average width w is greater than the average distance t. The first surface defines a first opening and the second surface defines a second opening. The first opening and the second opening are in fluid communication with each other. The apparatus also includes an actuator assembly removably coupled to the body. At least a portion of the actuator assembly is disposed within the second opening. The actuator assembly has a storage configuration and a cutting configuration. The apparatus also includes a blade coupled to the actuator assembly and including a surface having a plane oriented in a direction of the average length l. The plane is substantially normal to the first surface and the actuator assembly further includes a cutting edge that is configured to be disposed between the first surface and the second surface while the actuator assembly is in the storage configuration and that is configured to be disposed beyond the first surface while the actuator assembly is in the cutting configuration.

According to an embodiment, an apparatus includes a body having a first surface that is substantially planar, and a second surface. The first surface has a surface area greater than an area of a cross section of the body normal to the first surface. The body defines an aperture that defines a normal axis substantially normal to the first surface and the second surface. The apparatus also includes an actuator assembly removably coupled to the body. The actuator assembly has a storage configuration and a cutting configuration. At least a portion of the actuator assembly is disposed within the aperture. The apparatus also includes a cutting member coupled to the actuator assembly and including (1) a surface substantially normal to the first surface and (2) a cutting edge configured to be disposed (a) between the first surface and the second surface while the actuator assembly is in the storage configuration and (b) beyond the first surface while the actuator assembly is in the cutting configuration.

According to an embodiment, an apparatus includes a body having a first surface and a second surface. The first surface has a surface area greater than an area of a cross section normal to the first surface. The body defines an aperture that defines a normal axis substantially normal to the first surface and the second surface. The apparatus also includes an actuator assembly magnetically coupled to the body and having a storage configuration and a cutting configuration. At least a portion of the actuator assembly is disposed within the aperture. The apparatus also includes a cutting member coupled to the actuator assembly and having (1) a surface substantially normal to the first surface and (2) a cutting edge configured to be disposed (a) between the first surface and the second surface while the actuator assembly is in the storage configuration and (b) beyond the first surface while the actuator assembly is in the cutting configuration.

DETAILED DESCRIPTION

Figure 1:
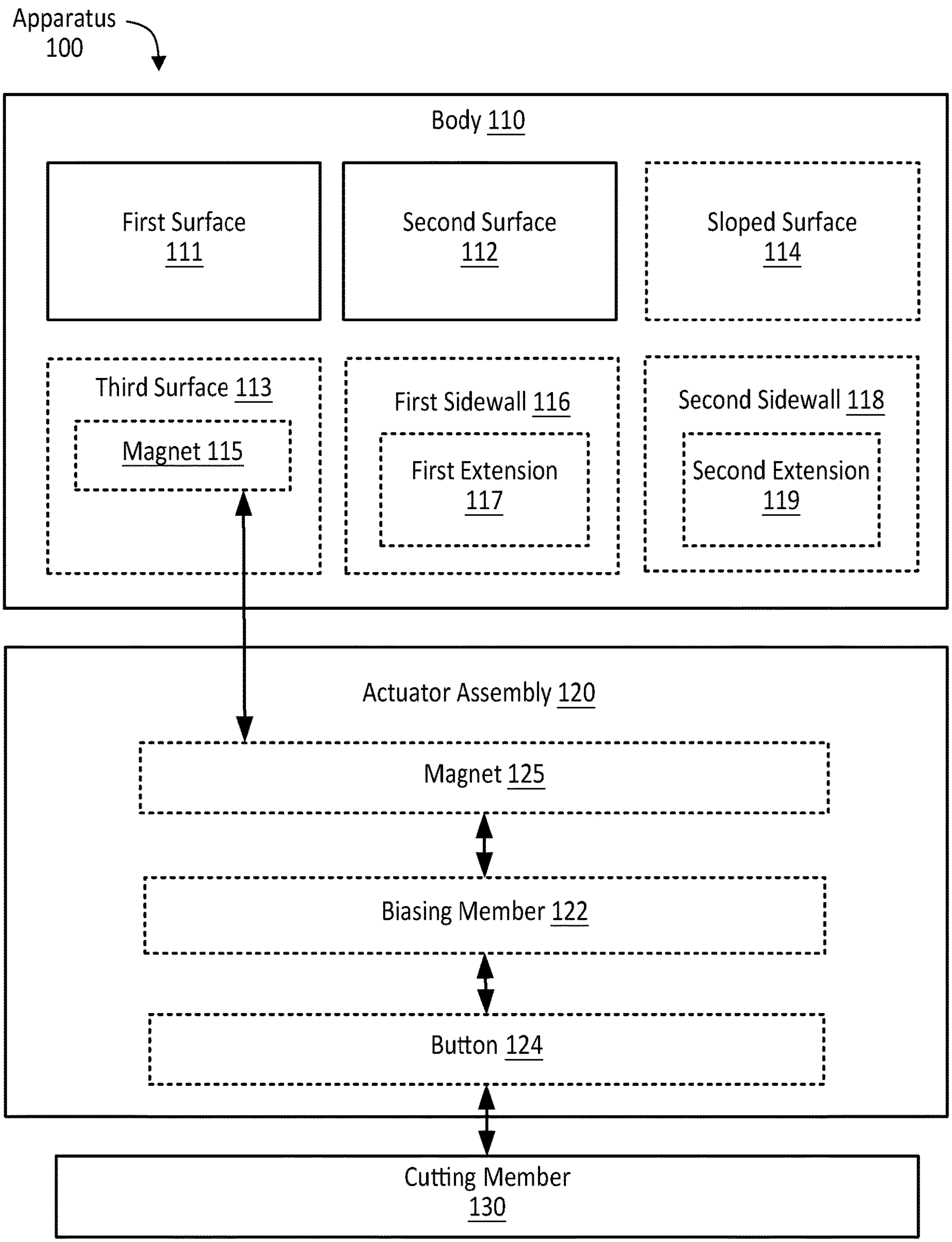
FIG. 1 is a schematic block diagram illustrating an apparatus, according to an embodiment.

Some products can be enclosed and/or sealed in disposable containers constructed from thin materials. For example, items to be shipped can be packaged in boxes constructed of cardboard (e.g., paperboard, corrugated cardboard, etc.), containers constructed of rigid or semi-rigid plastic, and/or the like. Typically, cardboard containers, for example, are taped and/or glued shut, and items within these containers can be accessed by cutting the containers. To cut these containers, some known utility knives (e.g., "box cutters") exist that can include a blade secured to a handle. These known utility knives can be used to open cardboard containers using a slicing movement, where the knife is pulled by a user across the top or side of the container to cut the cardboard, tape, and/or glue. In some instances, this slicing movement can cause bodily injury due to the exposed blade. For example, typically, a user holds steady a cardboard box in front of them with one hand, performing the slicing movement with the known utility knife by pulling the knife with the other hand toward the user and across the top or sidewall of the box. As a result of the user pulling the knife towards them through the cardboard (which can present resistance to the slicing movement), the user can be at risk of experiencing a self-inflicted wound when the knife blade travels free of the cardboard following the cut and catches the user's hand, fingers, arm, waist, leg, etc.

Additionally, a product enclosed in a container can be fragile and/or prone to being cut unintentionally as the container is being cut to expose the product. It can be preferable to cut open a box without cutting the contents within the box; however, some known utility knives include long blades that, when plunged into a surface of the container, can contact and/or slice a product within. Furthermore, some known utility knives can include blades that remain extended and/or exposed when not in use. As a result, an inattentive person can cause injury to themselves by, for example, grazing the sharp cutting edge of the blade, knocking the knife off a surface onto their foot, etc. In some instances, an unsupervised child can cause injuries to themselves and/or others if they come into possession of a utility knife having an exposed blade. Yet another area of concern for some known utility knife designs is a lack of storage options for the knife itself. For example, some known utility knives are placed in drawers or on counters when not in use, which can make it more likely for the utility knife to be lost, misplaced, and/or come into possession of an unauthorized user, such as a child.

Moreover, some known utility knives can be difficult to hold due to their slender design and/or can demand a relatively high level of manual dexterity, hand coordination, and/or hand strength to operate. For example, some known utility knives are designed to be held at an angle that can cause wrist discomfort. Additionally, users often need to remain focused when operating some known utility knives so as to not cause injury to themselves or damage contents within a container. In some instances, an elderly user and/or a user with a disability can have difficulty holding and/or maneuvering some known utility knives. Some known utility knives can be especially difficult to maneuver while performing delicate operations, such as the removal of tape from a carboard box or cutting a tag from a t-shirt.

Thus, there is a need for an apparatus that (1) includes a blade that retracts into a storage configuration when not in use, (2) can be stored securely in a designated and/or convenient location, (3) has an improved design for grasping and/or performing delicate operations, and/or (4) is configured for use in a slicing movement that reduces the risk of harm to the user and/or contents within a container.

While some example uses described herein relate to opening and/or cutting a container (e.g., a carboard box, plastic packaging, etc.), it should be appreciated that one or more embodiments described herein can be used for a variety of tasks, such as, for example, shipping-and-receiving (e.g., cutting banding straps), drywalling (e.g., scoring drywall and/or cutting drywall tape), wallpapering, floor installation (e.g., cutting linoleum, carpets, etc.), and/or the like.

FIG. 1 is a schematic block diagram illustrating an apparatus 100, according to an embodiment. The apparatus 100 can be an example implementation of a handheld cutting tool configured for use in a cutting, slicing, and/or scraping operation(s). The apparatus 100 includes a body 110, an actuator assembly 120, and a cutting member 130.

In some implementations, the body 110 can be a monolithic structure or an assembly of body components, constructed from, for example, plastic, metal, resin, nylon, wood, or any other suitable material. As described herein, the body 110 can be dimensioned such that the apparatus 100 can be comfortably handled within a user's hand. The body 110 includes a first surface 111, a second surface 112, a third surface 113, a sloped surface 114, a first sidewall 116, and a second sidewall 118.

The first surface 111 (e.g., the "lower surface" and/or "contact surface") can include a surface that is planar and/or substantially planar, such that the first surface 111 can rest on and/or slide along a surface of a package (or other item) during a cutting operation, as descried herein. A surface can be substantially planar if the surface has a measured flatness that is within a tolerance of, for example, 5 mm and/or 1% of the average length (described herein) of the first surface 111. Flatness can be measured based on, for example, the distance between two planes, the two planes being disposed a minimum distance away from each other while the entirety of the first surface is disposed between the two planes. In some implementations, the first surface 111 can have an average width and an average length (e.g., similar to the average width w and the average length/shown and described with respect to FIGS. 2C-2D). In some implementations, the first surface 111 can have a surface area (e.g., similar to $A_{first\_surface}$ shown and described with respect to FIG. 2F). In some implementations, the first surface 111 can define a first opening (e.g., similar to the first opening 207 of FIG. 2B) of an aperture (e.g., similar to the aperture 206 of FIG. 2A) in which a blade and/or cutting member can be disposed when the actuator assembly 120 is in a cutting configuration, as described herein.

The second surface 112 (e.g., the "upper surface" and/or "palm rest surface") can be substantially parallel to the first surface 111. Two surfaces can be substantially parallel to each other if, for example, the two surfaces define an angle of less than 10° between the two surfaces. The second surface 112 can be separated from the lower surface by the first sidewall 116 and the second sidewall 118 and/or, by an average distance and/or an average thickness (e.g., similar to the average distance t and/or the average thickness shown and described with respect to FIG. 2E). The body 110 can be configured such that, while a user performs a cutting operation using the apparatus 100, the palm of the user can rest on and/or be supported by the second surface 112.

The third surface 113 can be substantially parallel to the first surface 111 and/or the second surface 112 while being recessed relative to the second surface 112. The third surface 113 can have a boundary and/or profile that is equivalent or substantially similar to the second opening defined by the second surface 112 (e.g., similar to what is shown and described with respect to FIG. 2A). The third surface 113 can define a third opening that is concentric to the first opening and/or the second opening. At least one magnet 115 can be coupled to the third surface 113. The at least one magnet 115 can be configured to magnetically couple the actuator assembly 120 to the body 110, as described herein. In some implementations, the third surface 113 can define a magnet seat (e.g., similar to magnet seat 215 of FIG. 2A) for each magnet 115. The magnet seat can be sized such that at least a portion of the magnet 115 can be received by the magnet seat.

Figure 2A:
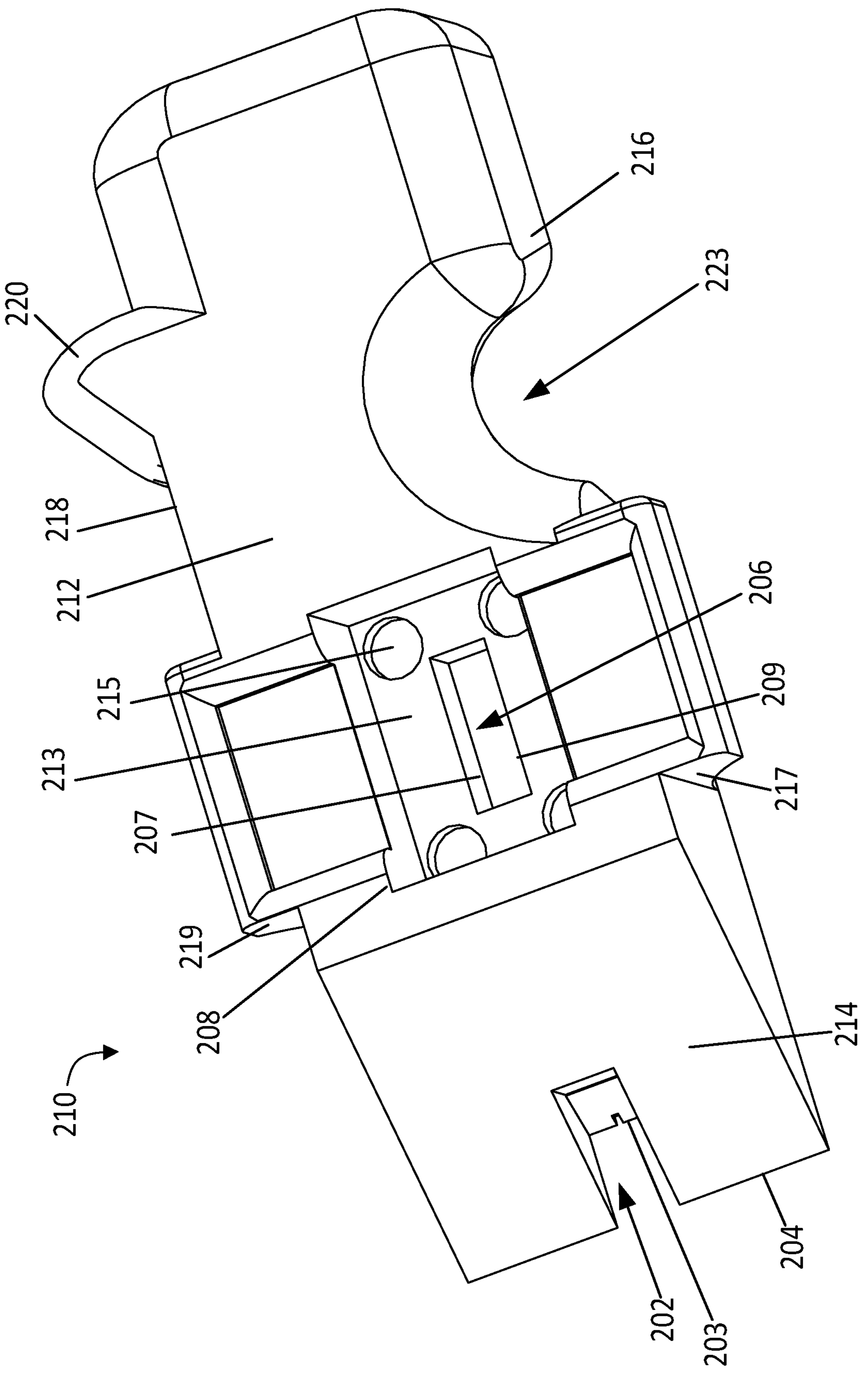
FIGS. 2A-2F are perspective views of an apparatus, according to an embodiment.

The body 110 can further include a sloped surface 114 that converges with the first surface 111, defining a front edge (e.g., similar to the front edge 204 of FIG. 2A). The front edge can be a leading edge while the apparatus 100 is being used in a cutting operation. The sloped surface 114 can be disposed between the front edge and the second surface 112, such that the sloped surface 114 can define (1) an acute angle relative to the first surface 111 and (2) an obtuse angle relative to the second surface 112. Said differently, the angle defined by the first surface 111 and the sloped surface 114 can be less than the angle defined by the second surface 112 and the sloped surface 114. The front edge and the sloped surface 114 can be configured for lifting and/or removing, for example, tape (e.g., packing tape), adhesives, wallpaper, and/or the like, from a surface.

A portion of the first surface and a portion of the sloped surface can collectively define a notch (e.g., similar to the notch 202 of FIG. 2A). The notch can bifurcate the front edge and, in some implementations, can be disposed or substantially disposed (e.g., within 5 mm) at a longitudinal axis (e.g., the longitudinal axis 230 of FIG. 2C) that intersects with the cutting member 130 (described herein) when the actuator assembly 120 (described herein) is coupled to the body 110. As a result of the notch being in line with the cutting member 130, the notch can assist a user with centering and/or positioning the apparatus 100 and/or cutting member 130 over a portion of material that a user desires to cut (e.g., a cardboard seam covered by packing tape).

In some implementations, the body 110 can include a cutting edge (e.g., similar to the cutting edge 203 of FIG. 2A) disposed within the notch and in addition to the cutting edge of the cutting member 130 (described herein). In some implementations, the cutting edge of the body 110 (e.g., the second cutting edge) can be monolithically defined by the body 110. Alternatively, in some implementations, the cutting edge of the body 110 can include a blade (e.g., a metal blade) disposed within the notch and coupled to the body 110. The cutting edge of the body 110 can be used to, for example, slice a T-shirt tag, paper, and/or other item for which a cut can be initiated at the edge of that item.

The first sidewall 116 and the second sidewall 118 can be disposed between the first surface 111 and the second surface 112. In some implementations, the first sidewall 116 and the second sidewall 118 can be substantially perpendicular to the first surface 111 and/or the second surface 112. Surfaces can be substantially perpendicular to each other if, for example, the angle defined between the two surfaces is between 80° and 100°. In some implementations, the first sidewall 116 can define a concave recess that can accommodate a thumb of a user, and the second sidewall 118 can include an protrusion that can support or be grasped by a pinkie finger of the user (e.g., similar to the discussion with respect to FIG. 2A). In some implementations, the first sidewall 116 can further include a first extension 117 (e.g., a first cantilever), and the second sidewall 118 can further include a second extension 119 (e.g., a second cantilever). The first extension 117 can be substantially opposite the second extension 119, such that an axis perpendicular to the longitudinal axis (e.g., similar to the longitudinal axis 230 of FIGS. 2C-2D, described herein) of the body 110 can bifurcate each of the first extension 117 and the second extension 119. In some implementations, the axis perpendicular to the longitudinal axis can intersect with a center of each of the first extension 117 and the second extension 119. In some implementations, a portion of the first extension 117 (e.g., a side of the first extension 117 that is substantially perpendicular to both the first sidewall 116 and the second surface 112) can rest on a first arm (e.g., similar to the first arm 506 of FIG. 5A) of a hanger plate (e.g., similar to the hanger plate 500 of FIG. 5A), and a portion of the second extension 119 can rest on a second arm (e.g., similar to the second arm 508 of FIG. 5A) of the hanger plate while the first surface 111 is parallel to and/or in contact with a surface (e.g., similar to the outer surface 502 of FIG. 5A) of the hanger plate. The hanger plate can be coupled (e.g., magnetically coupled) to a vertical surface (e.g., a fridge and/or metal surface), permitting the apparatus 100 to be hung while not in use.

The actuator assembly 120 can include at least one biasing member 122 and an actuator 124. In some implementations, the actuator assembly 120 can include, for example, any suitable number of biasing members 122 (e.g., 2, 3, 4, 10, etc.). The biasing member 122 can include, for example, a helical spring, leaf spring, dish spring, and/or the like. The biasing member 122 can be configured to bias the actuator 124 in an extended configuration (e.g., a storage configuration, as described herein) away from the body 110. While a user applies a normal force to the actuator 124 (e.g., while a user pushes the actuator 124, for example, with the user's index finger), said force can overcome the bias of the biasing member(s) 122, causing the actuator 124 to move closer (e.g., assume a cutting configuration, as described herein) to the body than when in the extended configuration. When the user stops applying the force and/or reduces the applied force to the actuator 124, the biasing member(s) 122 can cause the actuator 124 to move away from the body 110 and/or return to the extended configuration.

In some implementations, the second opening defined by the second surface 112 can be dimensioned such that at least a portion of the actuator 124 can be disposed within the second opening while the actuator 124 is in an extended configuration and/or while a user applies the normal force to the actuator 124. While the user applies the normal force, a greater portion of the actuator 124 can be disposed within the aperture (e.g., similar to the aperture 206 of FIG. 2A) defined in part by the second opening, the greater portion being larger than the portion of the actuator 124 being disposed within the aperture while no and/or a reduced normal force is applied to the actuator 124.

The actuator 124 can include an outward actuator surface (e.g., the outward surface 326 of FIG. 3) defining a depression (e.g., the depression 330 of FIG. 3) and/or contour configured to accept, for example, an index finger of a user. In some implementations, the outward actuator surface can include at least one ridge and/or a rubberized surface, configured to cause friction between and/or grip the index finger of the user.

The actuator 124 can further include an inward actuator surface (e.g., the inward surface 328 of FIG. 3) opposite the outward actuator surface and facing the body 110. The biasing member 122 can include a first end portion and a second end portion, the first end portion being coupled to the inward actuator surface, and a magnet 125 being coupled to the second end portion. The magnet 125 can have a polarity opposite of the polarity of the magnet 115 coupled to the body 110, such that the actuator assembly 120 can removably and/or magnetically couple to the body 110 via the magnet 115 and the magnet 125. In some embodiments, the actuator assembly 120 and/or the body 110 can include instead of or in addition to the magnet 115 and/or the magnet 125, an adhesive, a hook and loop fastener(s), and/or any other element(s) configured to removably couple the actuator assembly 120 to the body 110.

The cutting member 130 (e.g., a blade) can be disposed on the inward actuator surface. For example, the cutting member 130 can be coupled (e.g., releasably coupled or fixed) to the inward actuator surface, or the cutting member 130 can be a monolithic extension of the inward actuator surface. The cutting member 130 can include a cutting edge (e.g., the cutting edge 432 of FIG. 4) proximal to the front edge of the body 110 (e.g., the front edge 204 of FIG. 2A) and a support edge (e.g., the support edge 434 of FIG. 4) distal to the front edge of the body 110 and substantially parallel to the cutting edge. In some implementations, the cutting edge can be longer than the support edge, such that the cutting edge and a cross edge (e.g., the cross edge 436 of FIG. 4) between the cutting edge and the support edge defines a vertex (e.g., the vertex 438 of FIG. 4). The vertex can be configured to pierce a material (e.g., tape, cardboard, etc.), such that the cutting edge can then cut the material as the apparatus 100 is slid across the surface. The cutting member 130 can be constructed of metal, plastic, nylon, and/or any other material suitable for forming and/or maintaining the cutting edge. In some embodiments, the cutting edge can be angled and/or differently shaped to fit the intended use. For example, in some implementations, the support edge can be longer than the cutting edge and the cross edge angled between the cutting edge and the support edge can be sharp and used to cut along with the cutting edge.

In use, a user can grasp the apparatus by placing their thumb in the recess defined by the first sidewall 116, placing their pinkie finger on the protrusion of the second sidewall 118, and resting their palm on a portion of the second surface 112. The user can cause the first surface 111 to rest on and/or contact a surface that the user desires to cut. The user can press the actuator 124 of the actuator assembly 120 (e.g., using their index finger), causing the actuator 124 to move closer to the body 110 (e.g., in a direction normal to the first surface 111). The user can press the actuator 124 until, for example, the biasing member 122 and/or the third surface 113 prevents the actuator 124 from moving further towards the body. The third surface 113 can be disposed a distance away from the first surface 111 such that, while the actuator 124 is fully pressed towards the body 110, the cutting member 130 can extend beyond the first surface 111 sufficient to expose the cutting edge to cut a material (e.g., a cardboard container) without cutting, for example, an item beyond the material (e.g., an item within the cardboard container).

After the actuator 124 has moved sufficiently towards the body 110 as a result of the force applied by the user (e.g., the user's index finger), the actuator assembly 120 can be in a cutting configuration. In this configuration, the cutting member 130 coupled to the inward surface of the actuator 124 can extend through the first opening defined by the first surface 111. With the cutting member 130 being disposed beyond the first surface 111, at least a portion of the cutting edge and the vertex of the cutting member 130 can be exposed, such that the cutting member 130 can contact and/or slice through a material in contact with the first surface 111. The user can then push the apparatus 100 away from themselves, sliding the first surface 111 along the surface of the material to be cut and causing the cutting member 130 to slice through the material along the trajectory of the sliding. After the user has performed the cutting operation, the user can cease pressing the actuator 124 and/or can apply a reduced force to the actuator 124 (e.g., by lifting their index finger from the actuator 124), causing the biasing member 122 to move the actuator 124 away from the body 110 and causing the actuator assembly 120 to assume a storage configuration. In turn, the cutting member 130 can move within the aperture from the first opening towards the second opening, causing the vertex of the cutting member 130 to be disposed between the first surface 111 and the second surface 112. As a result, the cutting edge of the cutting member 130 and/or the vertex of the cutting member 130 can be enclosed within the body 110, such that the cutting edge and/or vertex cannot contact an object external to the apparatus 100.

In some instances, the cutting edge of the cutting member 130 can dull after repeated cutting operations. As a result of the actuator assembly 120 being removably and/or magnetically coupled to the body 110, a user can remove the actuator assembly 120 (including, for example, the biasing member 122, the actuator 124, and/or the magnet 125) to access the dull cutting member 130. In some implementations, the cutting member 130 can be removably coupled to the lower actuator surface, permitting a user to swap the dull cutting member 130 for a sharp and/or new cutting member 130. In some implementations, the user can replace the actuator assembly 120 with a new actuator assembly 120 including a sharp and/or new cutting member 130. To reinstall the actuator assembly 120, the user can, for example, engage the at least one magnet 125 of the replacement actuator assembly 120 with the at least one magnet 115 of the body 110.

Figure 2B:
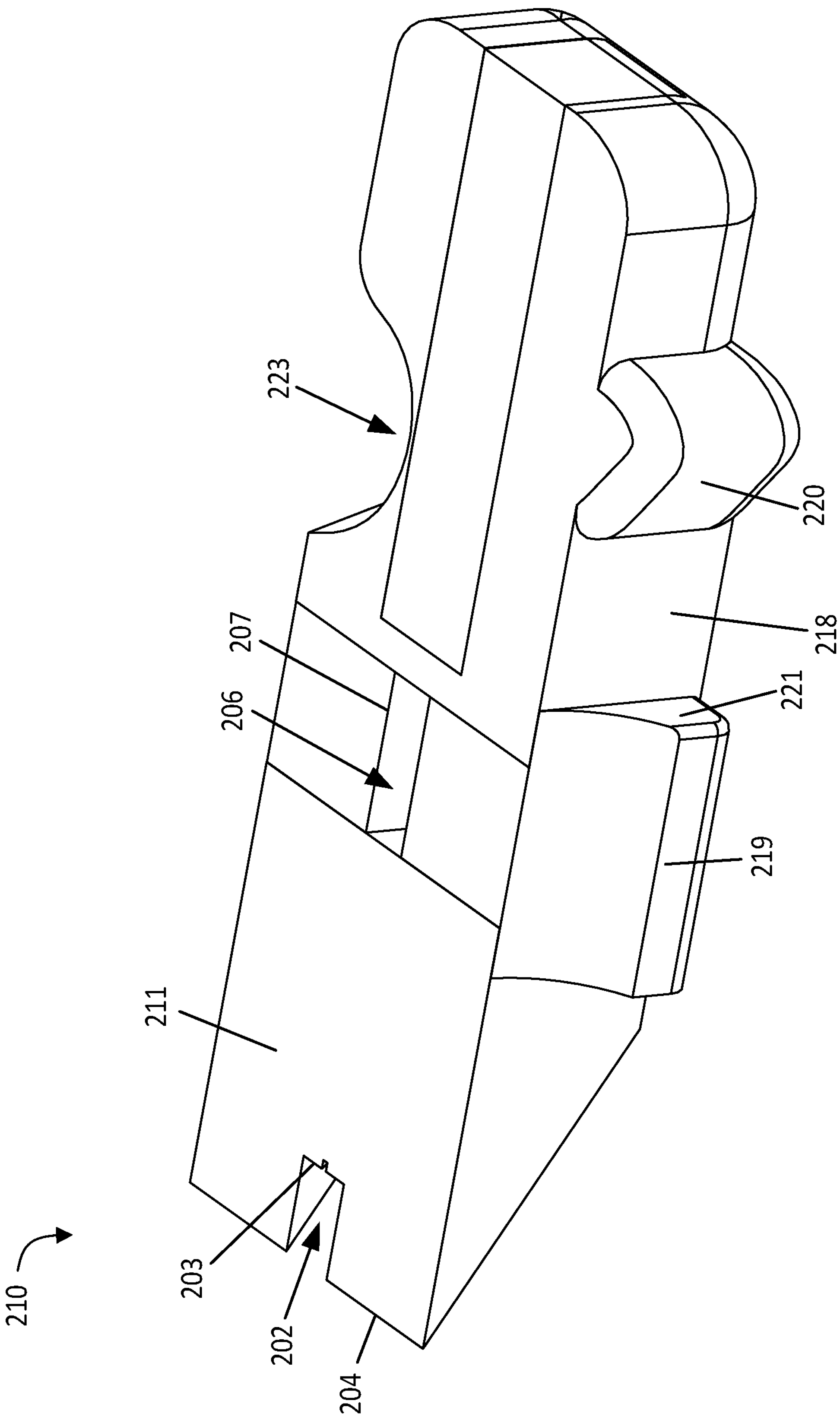

FIGS. 2A and 2B are perspective views of a body 210, according to an embodiment. The body 210 can be included in an apparatus that is structurally and/or functionally similar to, for example, the apparatus 100 of FIG. 1. The body 210 can be structurally and/or functionally similar to, for example, the body 110 of FIG. 1. The body 210 can include a notch 202 and a cutting edge 203 (e.g., a second cutting edge in addition to a first cutting edge of a cutting member, where the first cutting edge can be, for example, similar to the cutting edge 432 of FIG. 4). The body 210 can further include a front edge 204 defined by a first surface 211 (which can be structurally and/or functionally similar to, for example, the first surface 111 of FIG. 1) and a sloped surface 214 (which can be functionally and/or structurally similar to, for example, the sloped surface 114 of FIG. 1).

The body 210 can further define an aperture 206 through which an actuator assembly and/or a cutting member can be disposed. Specifically, the aperture 206 can be defined by: (1) a first opening 207 defined by the first surface 211, (2) a second opening 208 defined by the second surface 212, and/or (3) a third opening 209 defined by a third surface 213 (e.g., a third surface functionally and/or structurally similar to the third surface 113 of FIG. 1). The third surface 213 can define one or more magnet seats 215, which can each accept, for example, a magnet 115 as described in relation to FIG. 1. In some implementations, as shown in FIG. 2A, the third surface 213 can define four magnet seats 215.

The body 210 can further include a first sidewall 216 and a second sidewall 218. In some implementations, such as the example implementation shown in FIG. 2A, the first sidewall 216 can define a concave recess 223 that can accept a thumb of a user's right hand, and the second sidewall 218 can include a protrusion 220 that can support a pinkie of the user's right hand. Alternatively, although not shown in FIGS. 2A and 2B, the body 210 can be configured for use by left-handed users. For example, the second sidewall 218 can define the concave recess 223 (which can receive a thumb of a user's left hand, and the first sidewall 216 can include the protrusion 220 (which can support the pinkie of the user's left hand).

The first sidewall 216 and the second sidewall 218 can further include, respectively, a first extension 217 and a second extension 219. The first extension 217 and the second extension 219 can contact, respectively, a first arm (e.g., the first arm 506 of FIG. 5A) of a hanger plate (e.g., the hanger plate 500 of FIG. 5A) and a second arm (e.g., the second arm 508 of FIG. 5A) of the hanger plate while the body 210 hangs from the hanger plate. Specifically, a portion of each extension, such as an extension surface 221, can rest on the arms of the hanger plate while the hanger plate is coupled to a vertical surface, causing the body 210 to be suspended such that the first surface 211 is also oriented vertically and/or substantially vertically.

Figure 2C:
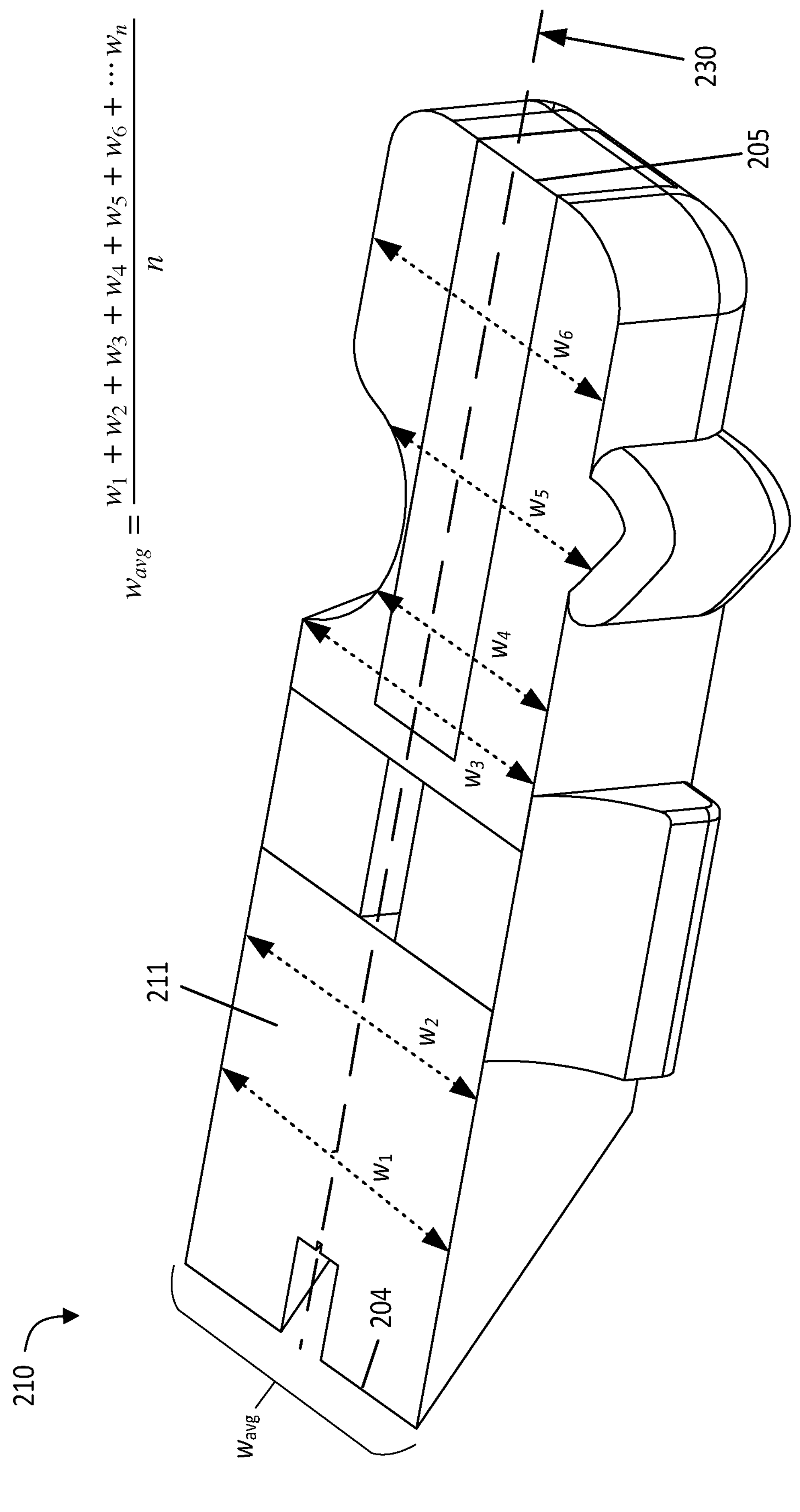

FIG. 2C is perspective view of the body 210 illustrating a measurement of an average width (e.g., w and/or $w_{avg}$) of the first surface 211. In some instances, the average width can be determined based on one or more widthwise measurements taken perpendicular to a longitudinal axis 230 defined by the body 210. The longitudinal axis 230 can be substantially perpendicular to the front edge 204 and/or substantially parallel (e.g., within) 10° to at least a portion of the first sidewall 216 and/or the second sidewall 218. In some instances, the average width can be determined based on the average of multiple widthwise measurements (e.g., $w_1$, $w_2$, $w_3$, $w_4$, $w_5$, $w_6$, etc.) taken between the front edge 204 and a rear edge 205 of the first surface 211 substantially opposite the front edge 204. In some instances, the average width can be determined based on an integral divided by a length (e.g., between the front edge 204 and the rear edge 205) of the first surface 211 measured along the longitudinal axis 230, where the integral is of the width of the first surface 211 along the length.

Figure 2D:
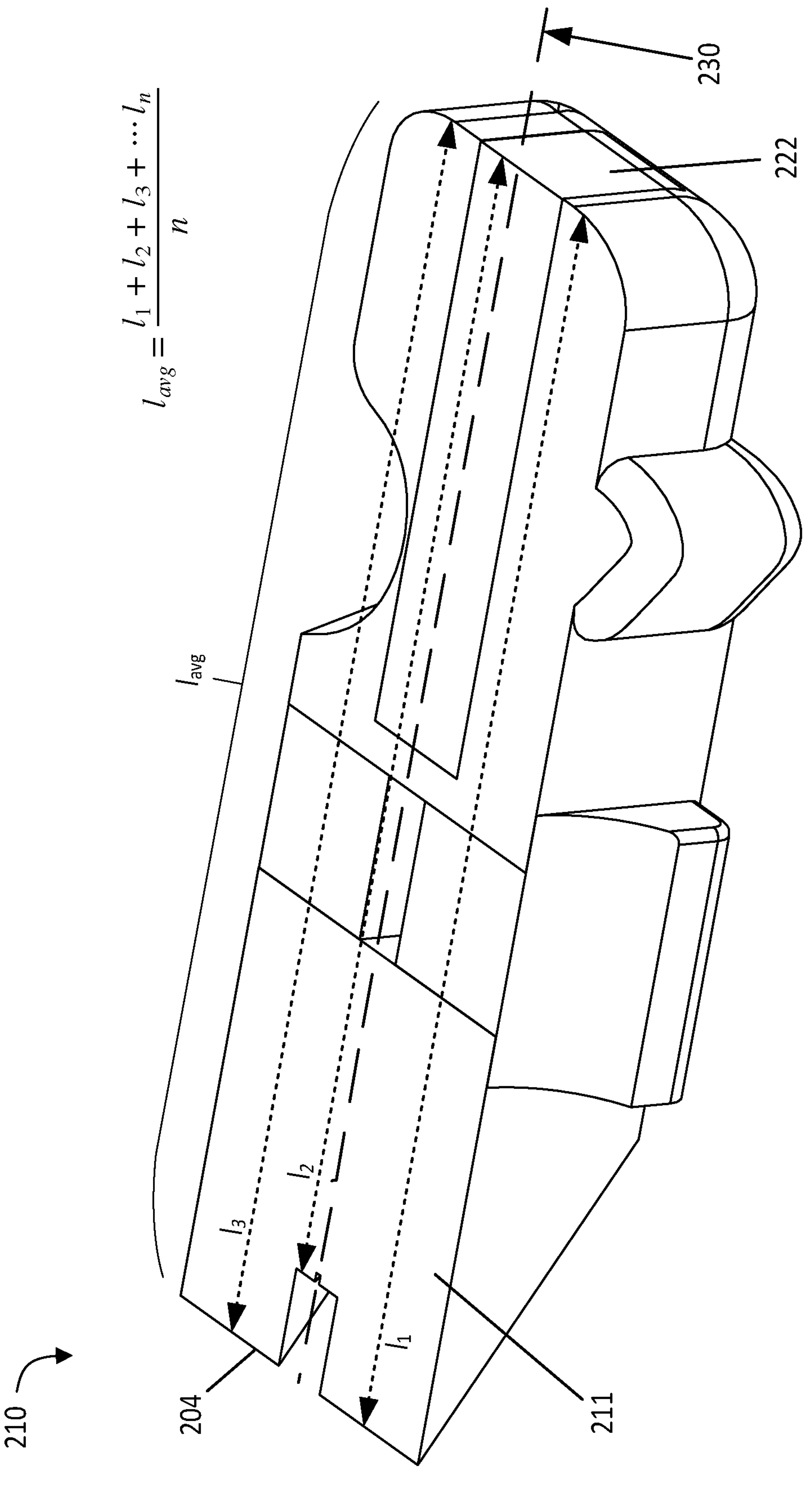

FIG. 2D is perspective view of the body 210 illustrating a measurement of an average length (e.g., l and/or $l_{avg}$) of the first surface 211. In some instances, the average length can be determined based on one or more lengthwise measurements taken parallel to the longitudinal axis 230. In some instances, the average length can be determined based on the average of multiple lengthwise measurements (e.g., $l_1$, $l_2$, $l_3$, etc.) taken between the first sidewall 216 and the second sidewall 218. In some instances, the average length can be determined based on an integral divided by a width (e.g., between the first sidewall 216 and the second sidewall 218) of the first surface 211 measured perpendicular to the longitudinal axis 230, where the integral is of the length of the first surface 211 along the width.

Figure 2E:
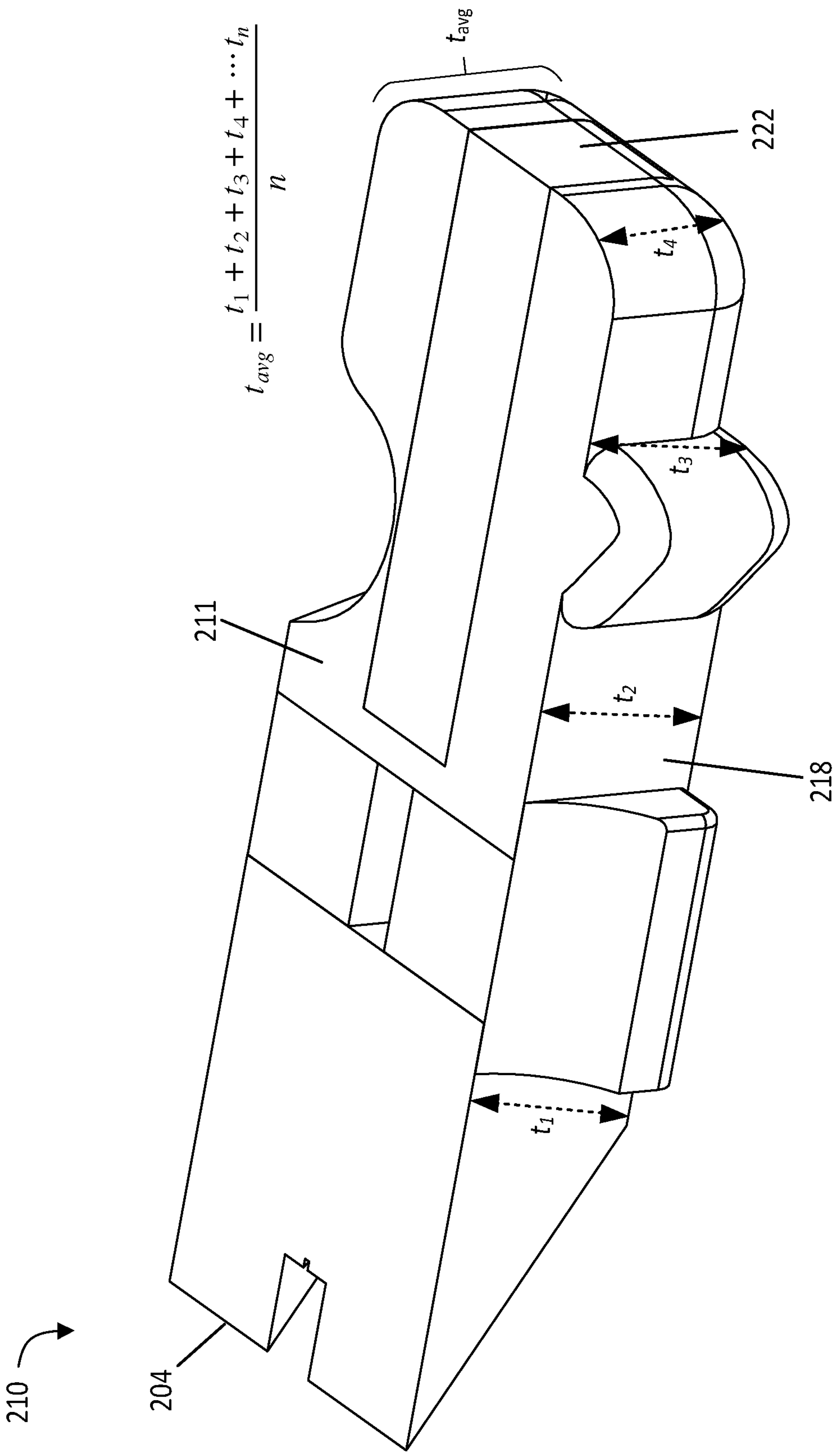

FIG. 2E is perspective view of the body 210 illustrating a measurement of an average distance (e.g., t and/or $t_{avg}$) between the first surface 211 and the second surface 212 (e.g., the average thickness of the body 210 and/or the average height h of the first sidewall 216 and/or the second sidewall 218). In some instances, the average distance can be determined based on one or more measurements taken perpendicular (or substantially perpendicular) to and between the first surface 211 and the second surface 212. In some instances, the average distance can exclude any measurement between the sloped surface 214 and the first surface 211. In some instances, the average distance can include an average of multiple distances measured between the first surface 211 and the second surface 212 and across the first sidewall 216, the second sidewall 218, and/or a rear wall 222 opposite the front edge 204.

Figure 2F:
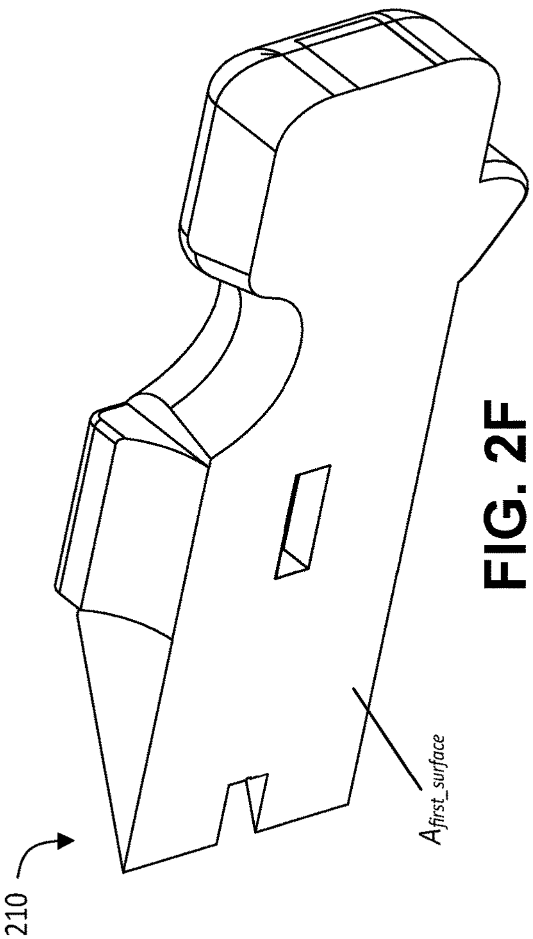
Figure 2G:
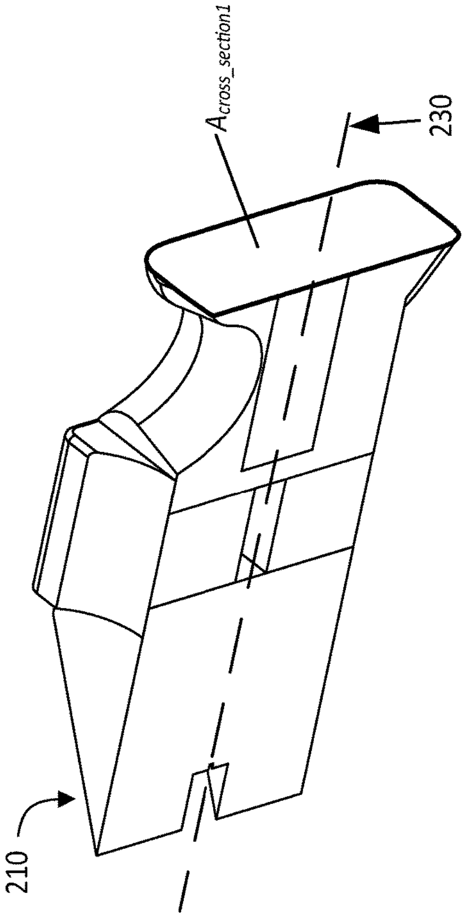
FIGS. 2G and 2H are perspective views of different cross sections of an apparatus, according to an embodiment.
Figure 2H:
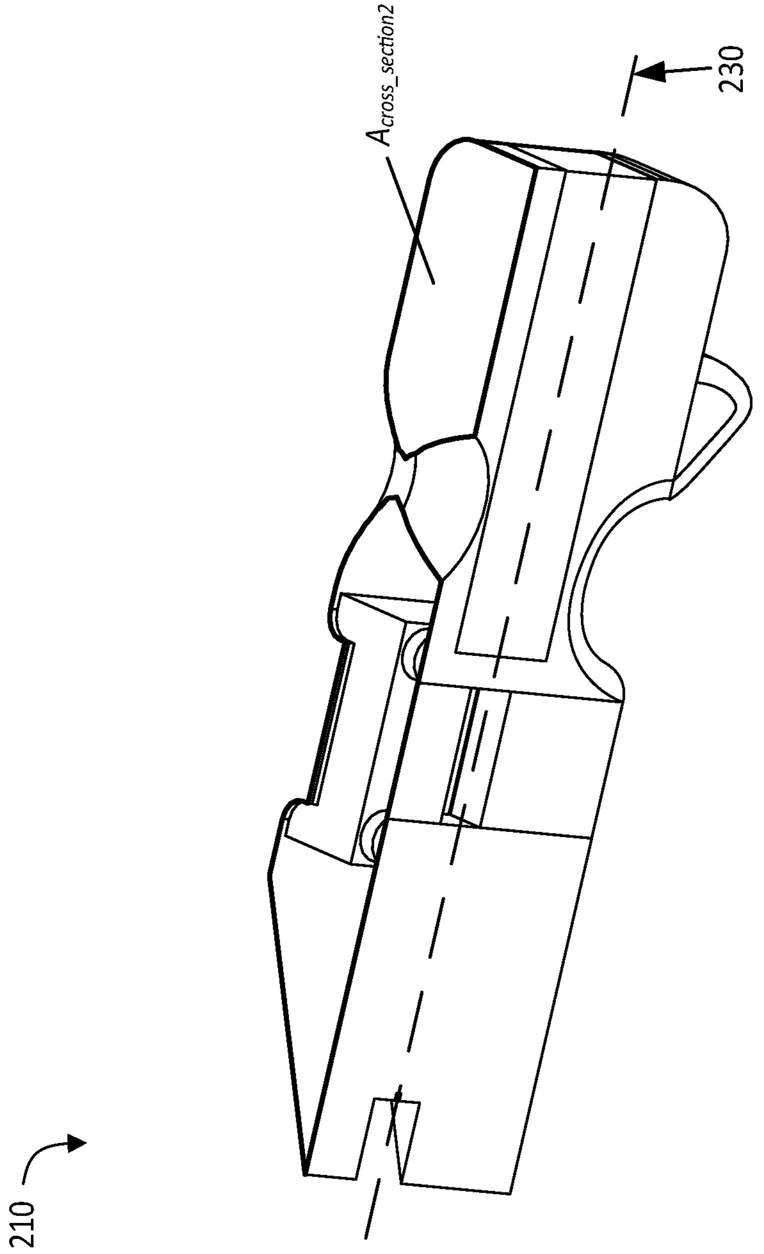

FIGS. 2F-2H are perspective views of the body 210 illustrating a measurement of a surface area of the first surface 211 (e.g., $A_{first\_surface}$) and a surface area of two different cross sections of the body 210 (e.g., $A_{cross\_section1}$ and $A_{cross\_section2}$). The surface area $A_{first\_surface}$ of the first surface 211 can include, for example, the area of the first surface 211 bounded, at least in part, by the front edge 204, the rear edge 205, the first sidewall 216, and/or the second sidewall 218. In some instances, the surface area $A_{first\_surface}$ of the first surface 211 can exclude the area of the first opening 207. The surface area of two different cross sections $A_{cross\_section1}$ and $A_{cross\_section2}$ are shown in FIGS. 2G and 2H, respectively. In the first example shown in FIG. 2G, the cross section can include, for example, a cross section that: (1) is parallel to the front edge 204, (2) is normal to at least one of the first surface 211 and/or the second surface 212, and/or (3) intersects a portion of the second surface 212 (e.g., and does not intersect the sloped surface 214). The cross section in FIG. 2G can have a surface area $A_{cross\_section1}$. In the second example shown in FIG. 2H, the cross section can include, for example, a cross section that: (1) is perpendicular to the front edge 204, (2) is normal to at least one of the first surface 211 and/or the second surface 212, and/or (3) intersects a portion of the rear wall 222. The cross section in FIG. 2H can have a surface area $A_{cross\_section2}$.

Referring to the measurements illustrated in FIGS. 2C-2G, the first surface 211 can be disposed an average distance $t_{avg}$ (e.g., as shown in FIG. 2E) from the second surface, can have an average length $l_{avg}$ (e.g., as shown in FIG. 2D), and can have an average width Wave (e.g., as shown in FIG. 2C), the average length $l_{avg}$ being greater than the average width Wave, and the average width Wave being greater than the average distance $t_{avg}$. In some instances, the surface area $A_{first\_surface}$ of the first surface 211 (e.g., as shown in FIG. 2F) can be greater than the area of a cross section (e.g., the cross section $A_{cross\_section1}$ shown in FIG. 2G and/or the cross section $A_{cross\_section2}$ shown in FIG. 2H).

Figure 3:
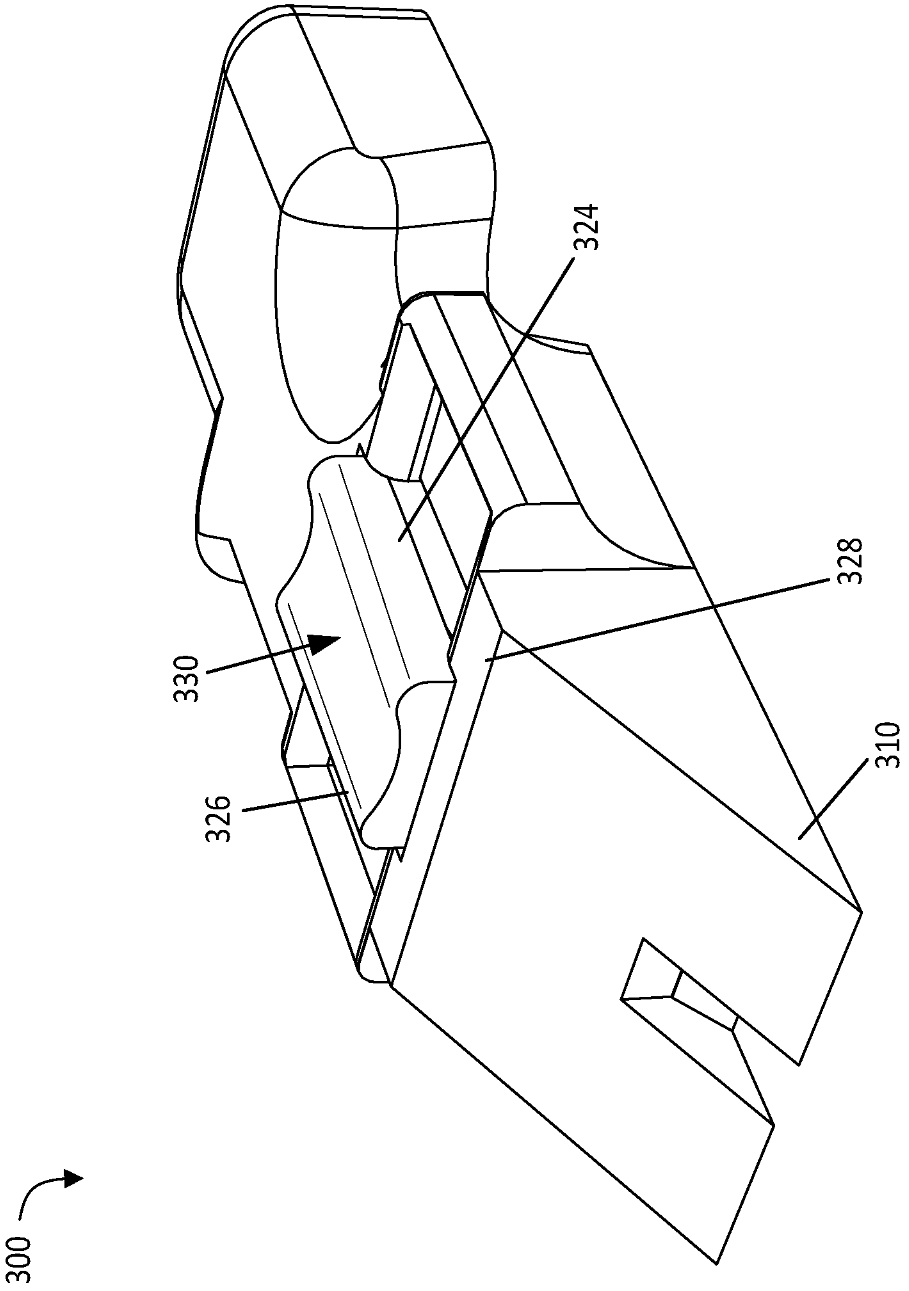
FIG. 3 is a perspective view of an actuator included in an apparatus, according to an embodiment

FIG. 3 is a perspective view of an actuator 324 included in an apparatus 300, according to an embodiment. The apparatus 300 can be structurally and/or functionally similar to a portion of the apparatus 100 of FIG. 1. The apparatus 300 can include the body 310, which can be structurally and/or functionally similar to the body 110 of FIG. 1 and/or the body 210 of FIGS. 2A and 2B. The actuator 324 can include an outward actuator surface 326 and an inward actuator surface 328. The outward actuator surface 326 can define a depression 330, and the inward actuator surface 328 can be coupled to at least one biassing member that is structurally and/or functionally similar to, for example, the biassing member 122 of FIG. 1 and/or the biassing member 422 of FIG. 4. The inward actuator surface 328 can be further coupled to a cutting member that is structurally and/or functionally similar to, for example, the cutting member 130 of FIG. 1 and/or the cutting member 430 of FIG. 4. While the actuator 324 is coupled to the body 310 (e.g., via the biassing member(s) and magnets, as described herein), at least a portion of the actuator 324 can be disposed within a second opening (e.g., the second opening 208 of FIG. 2A) defined by a second surface (e.g., the second surface 212 of FIG. 2A) of the body 310. The actuator 324 can further be disposed a non-zero distance from a third surface (e.g., the third surface 213 of FIG. 2A) of the body 310 while the actuator 324 is depressed and/or while an actuator assembly that includes the actuator 324 is in a storage configuration. When the actuator 324 is pressed (e.g., by the index finger of a user), the actuator assembly including the actuator 324 can assume a cutting configuration, where the actuator 324 is disposed closer to the third surface than when the actuator assembly is in the storage configuration.

Figure 4:
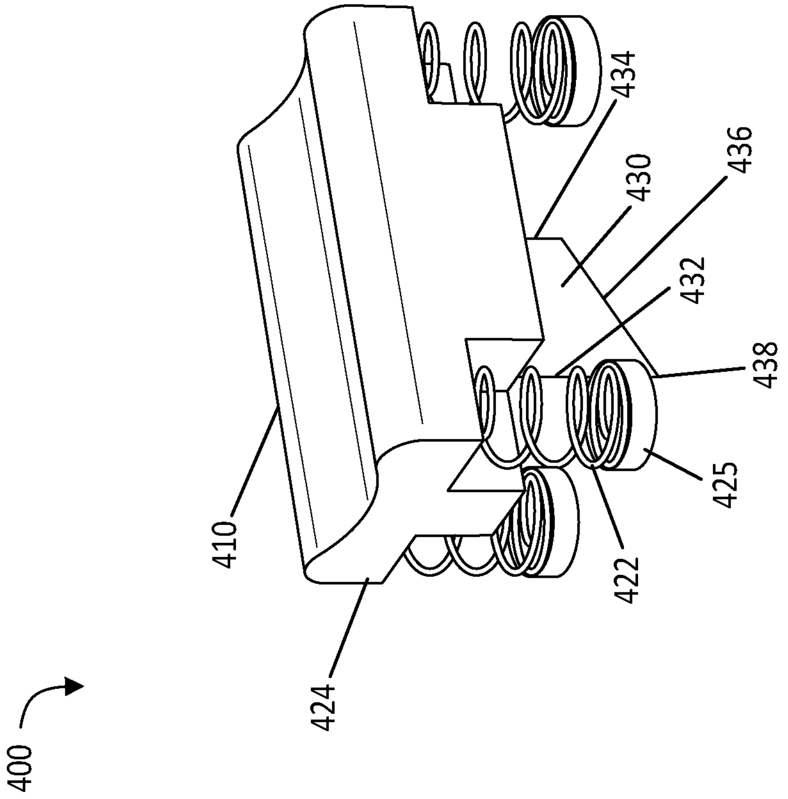
FIG. 4 is a perspective view of an assembly including an actuator assembly and a cutting member, according to an embodiment.

FIG. 4 is a perspective view of an assembly 400 including an actuator assembly 410 and a cutting member 430, according to an embodiment. The actuator assembly 410 can be structurally and/or functionally similar to, for example, the actuator assembly 120 of FIG. 1 and can include an actuator 424 (e.g., an actuator structurally and/or functionally similar to the actuator 124 of FIG. 1 and/or the actuator 324 of FIG. 3), one or more (e.g., four) biasing members 422 (which can include, for example, a biasing member structurally and/or functionally similar to the biassing member 122 of FIG. 1), and one or more (e.g., four) magnets 425 (which can include, for example, a magnet structurally and/or functionally similar to the magnet 125 of FIG. 1). A first end portion of a biassing member 422 can be coupled to the actuator 424, and a second end portion of the biassing member 422 substantially opposite the first end portion can be coupled to a magnet 425.

The actuator 424 can be further coupled to a cutting member 430, which can be structurally and/or functionally similar to the cutting member 130 of FIG. 1. The cutting member 430 can include a cutting edge 432, a support edge 434, a cross edge 436, and a vertex 438. In some implementations, as shown in FIG. 4, the cutting edge 432 can be longer than the support edge 434, such that the cutting edge 432 and the cross edge 436 define the vertex 438. In some implementations, the cutting edge 432 can be a sharp and/or fine edge configured for cutting, while the support edge 434 can be thicker than the cutting edge 432 to provide rigidity to the cutting member 430.

The assembly 400 can be removably coupled to a body (e.g., the body 110 of FIG. 1, the body 210 of FIGS. 2A and 2B, the body 310 of FIG. 3, and/or the like). For example, the magnet(s) 425 can interface with a magnet(s) (e.g., the magnet 115 of FIG. 1) coupled to the body. The assembly 400 can be coupled to the body such that the cutting member 430 can be disposed within the aperture 206. The cutting member 430 can be oriented relative to the body such that the cutting edge 432 is proximal to a front edge (e.g., the front edge 204 of FIGS. 2A and 2B) of the body and the support edge 434 is distal (as compared to the cutting edge 432) to the front edge. A surface of the cutting member 430 (e.g., the surface defined, at least in part, by the cutting edge 432, the support edge 434, and the cross edge 436) can be perpendicular to the front edge and/or parallel to a first sidewall (e.g., the first sidewall 116 of FIG. 1) and/or a second sidewall (e.g., the second sidewall 118 of FIG. 1).

Figure 5B:
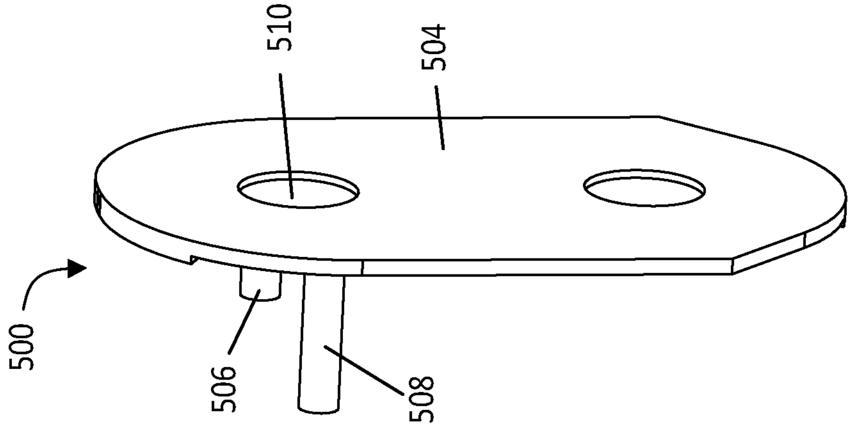
FIGS. 5A-5B are perspective views of a hanger plate, according to an embodiment.
Figure 5A:
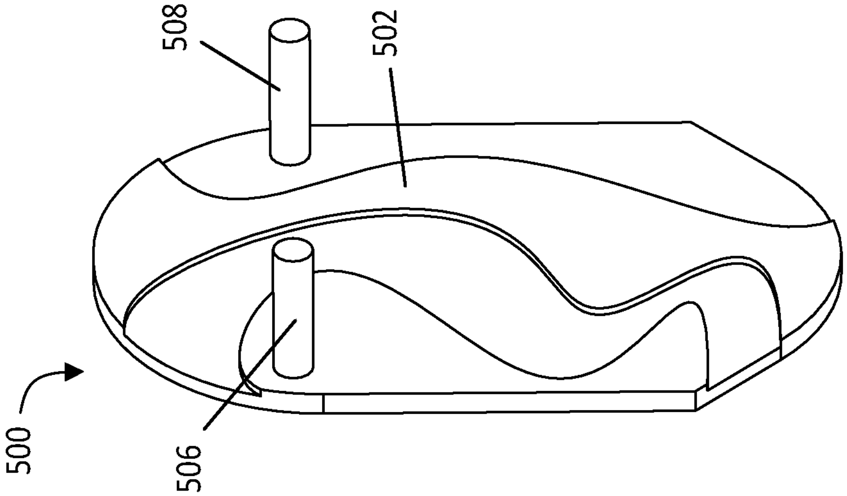

FIGS. 5A and 5B are perspective views of a hanger plate 500, according to an embodiment. The hanger plate 500 can include an outward hanger plate surface 502, an inward hanger plate surface 504, a first arm 506, a second arm 508, and a magnet seat(s) 510. The inward hanger plate surface 504 can be coupled to a vertical surface (e.g., a wall) via, for example, adhesive and/or a magnet(s) disposed in a magnet seat(s) 510. While the hanger plate 500 is coupled to the vertical surface, the first arm 506 and the second arm 508 can support an apparatus described herein (e.g., the apparatus 100 of FIG. 1). For example, a first extension (e.g., the first extension 117 of FIG. 1 and/or the first extension 217 of FIG. 2A) and a second extension (e.g., the second extension 119 of FIG. 1 and/or the second extension 219 of FIG. 2A) of the apparatus can rest on the first arm 506 and the second arm 508, respectively, as described herein.

In some embodiments, the apparatus can be attached and/or removably coupled to an external surface without the use of a hanger plate. For example, in some embodiments, the first surface (e.g., the first surface of 111 shown in FIG. 1) can be magnetic (or include a magnet). The first surface can then be removably coupled to another magnetic surface (e.g., a kitchen appliance). This can provide easy storage of the apparatus.

Figure 6A:
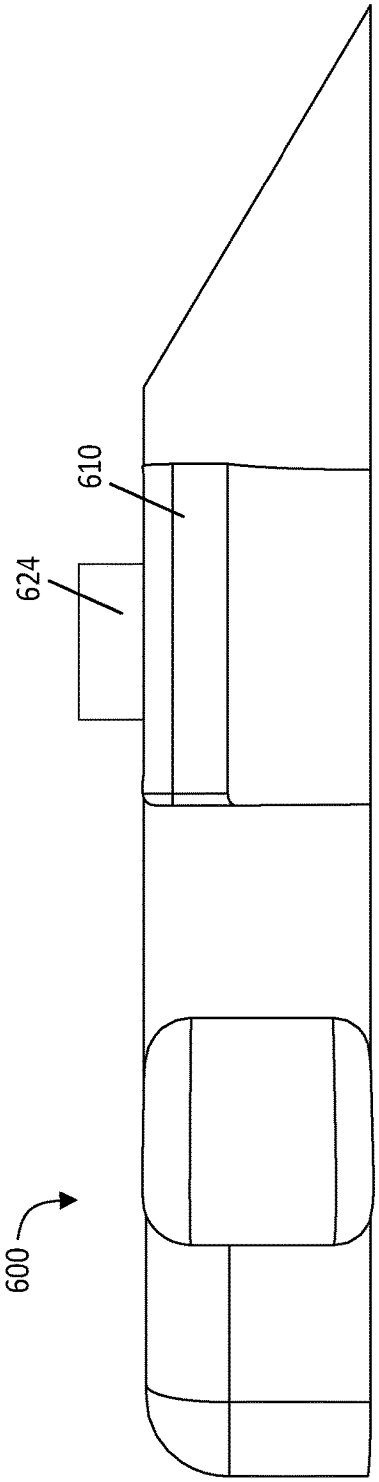
FIG. 6A is a side view of an apparatus in a storage configuration, according to an embodiment.

FIG. 6A shows a side view of an apparatus 600 in a storage configuration, according to an embodiment. The apparatus 600 can be in the storage configuration while the actuator 624 is not depressed, is resting and/or while a biassing member(s) coupled to the actuator 624 and the body 610 of the apparatus 600 causes the actuator 624 to be extended away from the body 610. As a result of the apparatus 600 being in the storage configuration, a cutting member coupled to the actuator 624 can be obscured by the body 610 when the apparatus 600 is observed from the side view, as shown in FIG. 6A. Said differently, while the apparatus 600 is in the storage configuration, no portion of the cutting member can extend beyond the body 610.

Figure 6B:
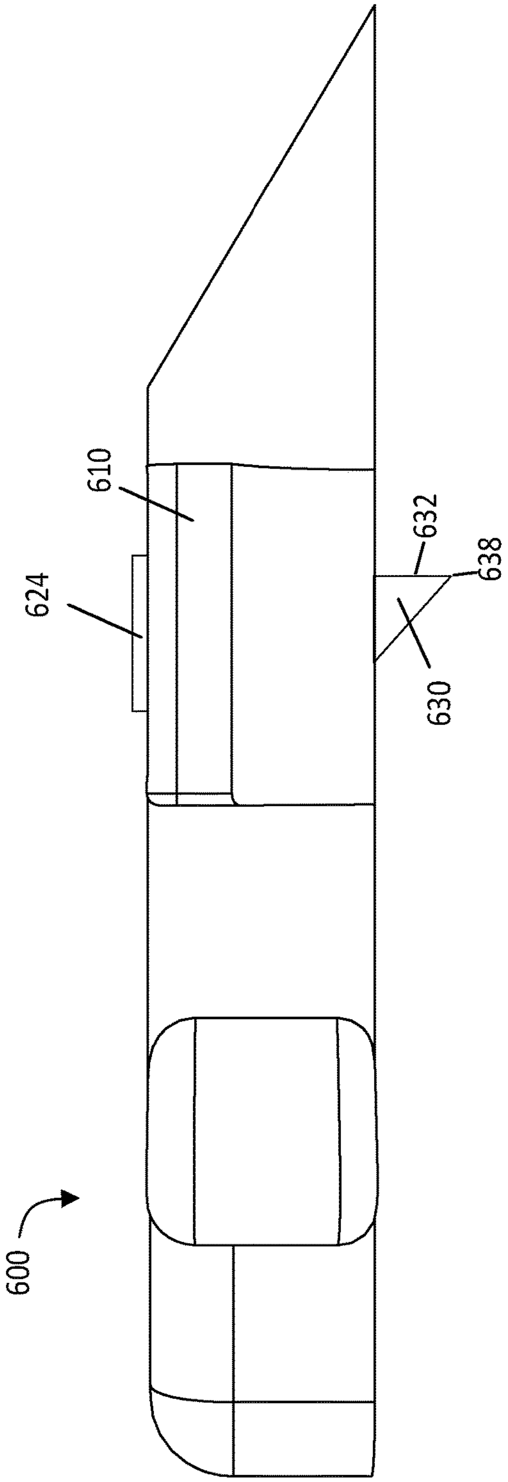
FIG. 6B is a side view of an apparatus in a cutting configuration, according to an embodiment.

FIG. 6B shows a side view of the apparatus 600 in a cutting configuration, according to an embodiment. A user can cause the apparatus 600 to transition from the storage configuration (as shown in FIG. 6A) to the cutting configuration (as shown in FIG. 6B) by pressing the actuator 624 towards the body 610 with sufficient force to overcome the bias caused by the biassing member(s). Similarly stated, a user can transition the apparatus 600 from the storage configuration to the cutting configuration by depressing the actuator 624. As compared to when the apparatus 600 is in the storage configuration, a distance separating an upper surface of the actuator 624 and the body 610 can be less when the apparatus 600 is in the cutting configuration. As a result of the apparatus 600 being in the cutting configuration, the cutting member 630 (including the cutting edge 632 and the vertex 638) can extend downward relative to the body 610, such that the cutting member 630 is visible when the apparatus 600 is observed from the side view shown in FIG. 6B.

Figure 7:
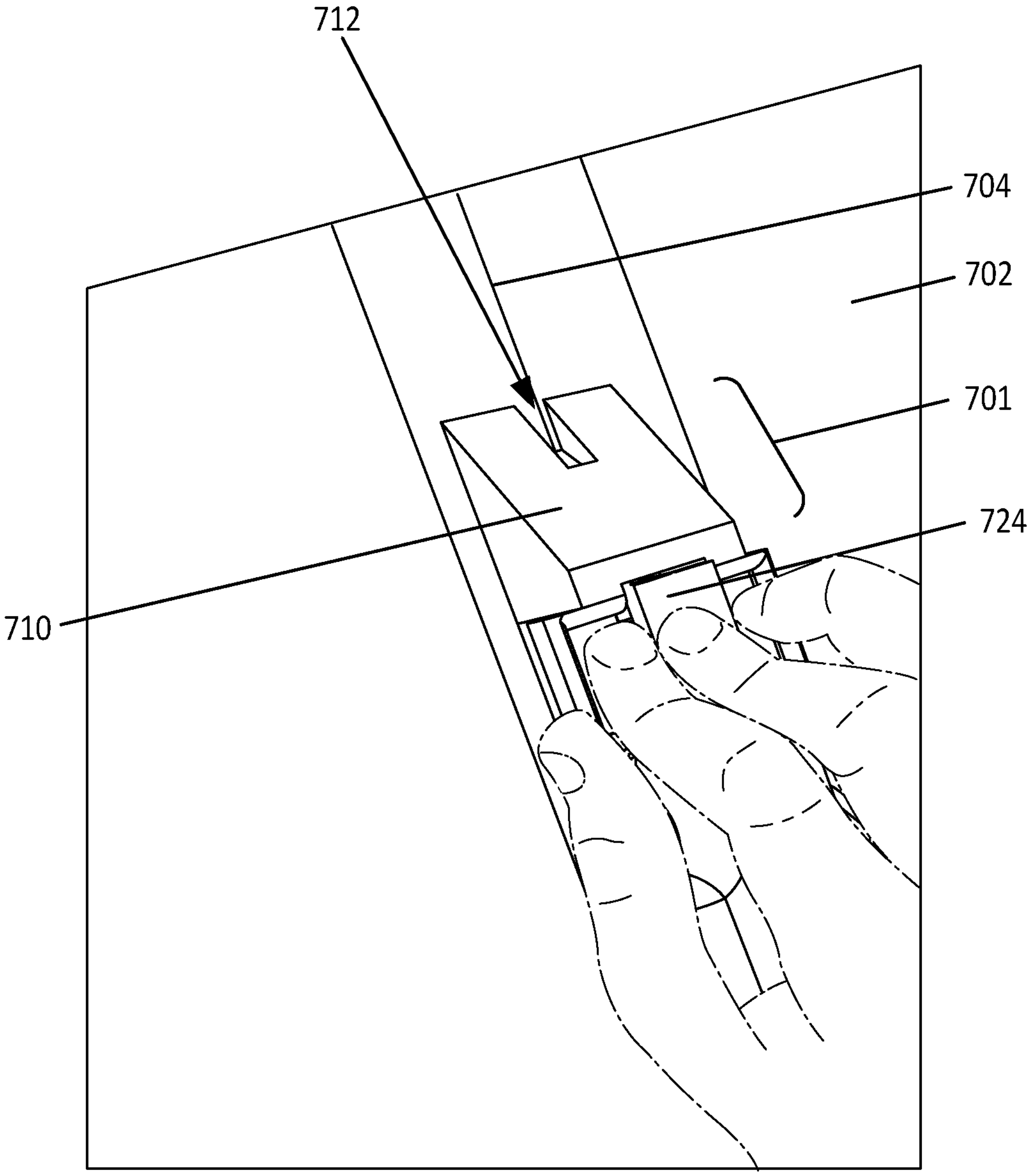
FIG. 7 shows an apparatus being used to cut a package, according to an embodiment.

FIG. 7 shows an apparatus 701 being used to cut a package 702, according to an embodiment. As shown, the apparatus 701 can be aligned with a seam 704 of the package 702 (e.g., by placing the apparatus 701 on the package 702 such that a portion of the seam 704 is aligned with the notch 712 defined by the body 710 of the apparatus 701). The seam 704 can be joined by tape to be cut using the apparatus 701. As a result of this positioning of the apparatus 701 relative to the package 702, a cutting member coupled to the actuator 724 can be disposed above the seam 704. To cause the apparatus 701 to transition from a storage configuration to a cutting configuration, a user can press the actuator 724 towards the body 710 and/or the surface of the package 702 with sufficient force to overcome a bias of at least one biassing member disposed between the actuator 724 and the body 710. As a result of the user pressing the actuator 724, the cutting member can pierce a portion of the tape disposed over the seam 704. While the apparatus is in the cutting configuration, the user can slide the apparatus 701 along the surface of the package 702 and in the direction (e.g., along the length) that the seam 704 extends, causing the cutting member to slice along the length of the tape. After the user has cut the tape disposed over the seam 704, the user can release the actuator 724, causing the apparatus 701 to reassume the storage configuration.

Figure 8:
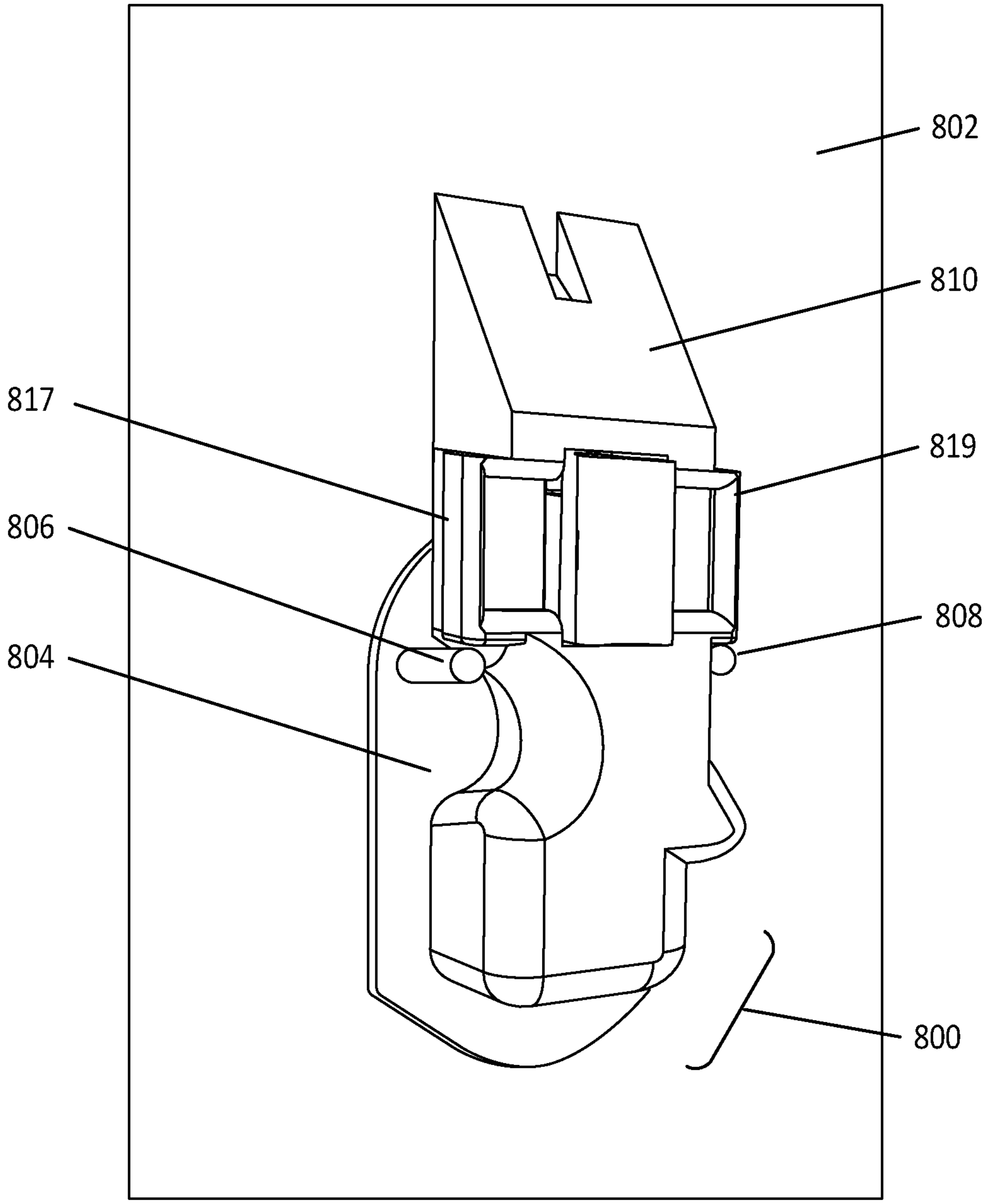
FIG. 8 shows an apparatus resting in a vertical orientation on arms of a hanger plate, according to an embodiment.

FIG. 8 shows an apparatus 800 (e.g., similar to the apparatus 100 of FIG. 1, apparatus 300 of FIG. 3, apparatus 600 of FIG. 6, and/or other apparatuses disclosed herein) resting in a vertical orientation on arms 806 and 808 of a hanger plate 804 (e.g., similar to hanger plate 500 of FIGS. 5A and 5B), according to an embodiment. The hanger plate 804 can be coupled (e.g., magnetically coupled) to a vertical surface 802 (e.g., a fridge surface, cabinet surface, etc.). A first extension 817 of the body 810 of the apparatus 800 can rest on the first arm 806, and a second extension 819 of the body 810 can rest on the second arm 808, causing the apparatus 800 to be suspended while not in use.

In an embodiment, an apparatus includes a body including a first surface and a second surface, the first surface being substantially planar, disposed an average distance t from the second surface, and having an average length l and an average width w. The average length/is greater than the average width w, and the average width w is greater than the average distance t. The first surface defines a first opening and the second surface defines a second opening. The first opening and the second opening are in fluid communication with each other. The apparatus also includes an actuator assembly removably coupled to the body. At least a portion of the actuator assembly is disposed within the second opening. The actuator assembly has a storage configuration and a cutting configuration. The apparatus also includes a blade coupled to the actuator assembly and including a surface having a plane oriented in a direction of the average length l. The plane is substantially normal to the first surface. The blade further includes a cutting edge that is configured to be disposed between the first surface and the second surface while the actuator assembly is in the storage configuration and that is configured to be disposed beyond the first surface while the actuator assembly is in the cutting configuration.

In some implementations, the actuator assembly can include at least one biasing member that has a storage state associated with the storage configuration and an actuated state associated with the cutting configuration. In some implementations, the body can include a third surface disposed between the first surface and the second surface. The third surface is substantially parallel to the first surface and the second surface. The third surface defines a third opening smaller than the second opening. The third opening is concentric with the second opening and the first opening. In some implementations, the actuator assembly can include at least one first magnet. Additionally, at least one second magnet can be coupled to the third surface. The at least one first magnet and the at least one second magnet are configured to releasably couple the actuator assembly to the third surface. In some implementations, the body can include a sloped surface. The first surface and the sloped surface can define a first angle, and a portion of the second surface and the sloped surface define a second angle greater than the first angle.

In some implementations, the first surface and the sloped surface can converge at a front edge, and the first surface and the sloped surface can define a notch that bifurcates the front edge. In some implementations, the body can include a sidewall substantially normal to the first surface. The sidewall has an average height h substantially equivalent to the average distance t. The sidewall defines a concave recess. In some implementations, the sidewall can be a first sidewall, and the body can include a second sidewall substantially normal to the first surface and opposite the first sidewall. The second sidewall has the average height h and includes a protrusion. In some implementations, the body can include a first sidewall and a second sidewall each substantially normal to the first surface and each having an average height h substantially equivalent to the average distance t. The first sidewall includes a first extension and the second sidewall includes a second extension substantially opposite the first extension. Additionally, the body can be configured to be suspended while (1) the first surface of the body is substantially parallel to a vertical surface, (2) at least a portion of the first extension rests on a first arm of a hanger plate magnetically coupled to the vertical surface, and (3) at least a portion of the second extension rests on a second arm of the hanger plate.

In an embodiment, an apparatus includes a body having a first surface that is substantially planar, and a second surface. The first surface having a surface area greater than an area of a cross section of the body normal to the first surface. The body defining an aperture that defines a normal axis substantially normal to the first surface and the second surface. The apparatus also includes an actuator assembly removably coupled to the body. The actuator assembly having a storage configuration and a cutting configuration. At least a portion of the actuator assembly is disposed within the aperture. The apparatus also includes a cutting member coupled to the actuator assembly and including (1) a surface substantially normal to the first surface and (2) a cutting edge configured to be disposed (a) between the first surface and the second surface while the actuator assembly is in the storage configuration and (b) beyond the first surface while the actuator assembly is in the cutting configuration.

In some implementations, the actuator assembly can include an actuator and at least one biasing member disposed between the actuator and the second surface and having a storage state associated with the storage configuration and an actuated state associated with the cutting configuration. In some implementations, the at least one biasing member can include a first end portion coupled to the actuator and a second end portion substantially opposite the first end portion and coupled to a first magnet. Additionally, a second magnet can be coupled to the body. The first magnet and the second magnet are configured to releasably couple the actuator assembly to the body. In some implementations, the actuator can include (1) an outward actuator surface having a depression and (2) an inward actuator surface opposite the outward actuator surface, and the cutting member can be disposed on the inward actuator surface. In some implementations, the body can include a third surface disposed between the first surface and the second surface. The third surface defines a portion of the aperture. Additionally, the second magnet can be coupled to the third surface. In some implementations, the body can define (1) a concave recess disposed at a first sidewall between the first surface and the second surface and (2) a protrusion disposed at a second sidewall substantially opposite the first sidewall. In some implementations, the body can include a sloped surface disposed anterior to the actuator assembly. The sloped surface converges with the first surface at a front edge and with the second surface at an intermediate edge. In some implementations, a portion of the first surface and a portion of the sloped surface can collectively define a notch. In some implementations, the cutting member can be a first cutting member, the cutting edge can be a first cutting edge, and the body can include a second cutting member disposed within the notch and having a second cutting edge parallel to the front edge.

In an embodiment, an apparatus includes a body having a first surface and a second surface. The first surface has a surface area greater than an area of a cross section normal to the first surface. The body defines an aperture that defines a normal axis substantially normal to the first surface and the second surface. The apparatus also includes an actuator assembly magnetically coupled to the body and having a storage configuration and a cutting configuration. At least a portion of the actuator assembly is disposed within the aperture. The apparatus also includes a cutting member coupled to the actuator assembly and having (1) a surface substantially normal to the first surface and (2) a cutting edge configured to be disposed (a) between the first surface and the second surface while the actuator assembly is in the storage configuration and (b) beyond the first surface while the actuator assembly is in the cutting configuration.

In some implementations, the body can include a first cantilever and a second cantilever substantially opposite the first cantilever. The body can be configured to be suspended while (1) the first surface is substantially parallel to a vertical surface, (2) at least a portion of the first cantilever rests on a first arm of a hanger plate magnetically coupled to the vertical surface, and (3) at least a portion of the second cantilever rests on a second arm of the hanger plate. Additionally, the body can include a sloped surface disposed anterior to the actuator assembly, the sloped surface converging with the first surface at a front edge and with the second surface at an intermediate edge, the front edge and the intermediate edge being substantially perpendicular to a longitudinal axis defined by the body. A portion of the first surface and a portion of the sloped surface can collectively define a notch. The cutting member can be a first cutting member, the cutting edge can be a first cutting edge, and the body can include a second cutting member disposed within the notch and having a second cutting edge parallel to the front edge. Additionally, the actuator assembly can include an actuator having an outward actuator surface and an inward actuator surface, the outward actuator surface defining a depression, the inward actuator surface being coupled to a first end portion of a biasing member, the biasing member having a storage state associated with the storage configuration, the biasing member further having an actuated state associated with the cutting configuration. A second end portion of the biasing member can be substantially opposite the first end portion of the biasing member. The second end portion is coupled to a first magnet. Additionally, a second magnet can be coupled to the body. The first magnet and the second magnet are configured to magnetically couple the actuator assembly to the body.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus, comprising:

a body including a first surface and a second surface, the first surface being substantially planar, disposed an average distance t from the second surface, and having an average length l and an average width w, the average length/being greater than the average width w, and the average width w being greater than the average distance t, the first surface defining a first opening and the second surface defining a second opening, the first opening and the second opening in fluid communication with each other;

an actuator assembly removably coupled to the body, at least a portion of the actuator assembly being disposed within the second opening, the actuator assembly having a storage configuration and a cutting configuration; and a blade coupled to the actuator assembly and including a surface having a plane oriented in a direction of the average length l, the plane being substantially normal to the first surface, the blade further including a cutting edge that is configured to be disposed between the first surface and the second surface while the actuator assembly is in the storage configuration and that is configured to be disposed beyond the first surface while the actuator assembly is in the cutting configuration.

2. The apparatus of claim 1, wherein the actuator assembly includes at least one biasing member that has a storage state associated with the storage configuration and an actuated state associated with the cutting configuration.

3. The apparatus of claim 1, wherein the body includes a third surface disposed between the first surface and the second surface, the third surface being substantially parallel to the first surface and the second surface, the third surface defining a third opening smaller than the second opening, the third opening being concentric with the first opening and the second opening.

4. The apparatus of claim 3, wherein:

the actuator assembly includes at least one first magnet; and at least one second magnet is coupled to the third surface, the at least one first magnet and the at least one second magnet configured to releasably couple the actuator assembly to the third surface.

5. The apparatus of claim 1, wherein:

the body includes a sloped surface;

the first surface and the sloped surface define a first angle; and a portion of the second surface and the sloped surface define a second angle greater than the first angle.

6. The apparatus of claim 5, wherein:

the first surface and the sloped surface converge at a front edge of the body; and the first surface and the sloped surface define a notch that bifurcates the front edge of the body.

7. The apparatus of claim 1, wherein the body includes a sidewall substantially normal to the first surface, the sidewall having an average height h substantially equivalent to the average distance t, the sidewall defining a concave recess.

8. The apparatus of claim 7, wherein:

the sidewall is a first sidewall; and the body includes a second sidewall substantially normal to the first surface and opposite the first sidewall, the second sidewall having the average height h and including a protrusion.

9. The apparatus of claim 1 in combination with a hanger plate, wherein:

the body includes a first sidewall and a second sidewall each substantially normal to the first surface and each having an average height h substantially equivalent to the average distance t, the first sidewall including a first extension and the second sidewall including a second extension substantially opposite the first extension; and the body is configured to be suspended while (1) the first surface of the body is substantially parallel to a vertical surface, (2) at least a portion of the first extension rests on a first arm of the hanger plate magnetically coupled to the vertical surface, and (3) at least a portion of the second extension rests on a second arm of the hanger plate.

10. An apparatus, comprising:

a body including a first surface that is substantially planar, and a second surface, the first surface having a surface area greater than an area of a cross section of the body normal to the first surface, the body defining an aperture that defines a normal axis substantially normal to the first surface and the second surface;

an actuator assembly removably coupled to the body, the actuator assembly having a storage configuration and a cutting configuration, at least a portion of the actuator assembly being disposed within the aperture; and a cutting member coupled to the actuator assembly and including (1) a surface substantially normal to the first surface and (2) a cutting edge configured to be disposed (a) between the first surface and the second surface while the actuator assembly is in the storage configuration and (b) beyond the first surface while the actuator assembly is in the cutting configuration.

11. The apparatus of claim 10, wherein the actuator assembly includes an actuator and at least one biasing member disposed between the actuator and the second surface and having a storage state associated with the storage configuration and an actuated state associated with the cutting configuration.

12. The apparatus of claim 11, wherein:

the at least one biasing member includes a first end portion coupled to the actuator and a second end portion substantially opposite the first end portion and coupled to a first magnet; and a second magnet is coupled to the body, the first magnet and the second magnet being configured to releasably couple the actuator assembly to the body.

13. The apparatus of claim 11, wherein:

the actuator includes (1) an outward actuator surface having a depression and (2) an inward actuator surface opposite the outward actuator surface; and the cutting member is disposed on the inward actuator surface.

14. The apparatus of claim 12, wherein:

the body includes a third surface disposed between the first surface and the second surface, the third surface defining a portion of the aperture; and the second magnet is coupled to the third surface.

15. The apparatus of claim 10, wherein the body defines (1) a concave recess disposed at a first sidewall between the first surface and the second surface and (2) a protrusion disposed at a second sidewall substantially opposite the first sidewall.

16. The apparatus of claim 10, wherein the body includes a sloped surface disposed anterior to the actuator assembly, the sloped surface converging with the first surface at a front edge of the body and with the second surface at an intermediate edge of the body.

17. The apparatus of claim 16, wherein a portion of the first surface and a portion of the sloped surface collectively define a notch.

18. The apparatus of claim 17, wherein the cutting member is a first cutting member, the cutting edge is a first cutting edge, and the body includes a second cutting member disposed within the notch and having a second cutting edge parallel to the front edge.

19. An apparatus, comprising:

a body including a first surface and a second surface, the first surface having a surface area greater than an area of a cross section normal to the first surface, the body defining an aperture that defines a normal axis substantially normal to the first surface and the second surface;

an actuator assembly magnetically coupled to the body and having a storage configuration and a cutting configuration, at least a portion of the actuator assembly being disposed within the aperture; and a cutting member coupled to the actuator assembly and including (1) a surface substantially normal to the first surface and (2) a cutting edge configured to be disposed (a) between the first surface and the second surface while the actuator assembly is in the storage configuration and (b) beyond the first surface while the actuator assembly is in the cutting configuration.

20. The apparatus of claim 19 in combination with a hanger plate, wherein:

the body includes a first cantilever and a second cantilever substantially opposite the first cantilever;

the body is configured to be suspended while (1) the first surface is substantially parallel to a vertical surface, (2) at least a portion of the first cantilever rests on a first arm of the hanger plate magnetically coupled to the vertical surface, and (3) at least a portion of the second cantilever rests on a second arm of the hanger plate;

the body includes a sloped surface disposed anterior to the actuator assembly, the sloped surface converging with the first surface at a front edge of the body and with the second surface at an intermediate edge of the body, the front edge and the intermediate edge being substantially perpendicular to a longitudinal axis defined by the body;

a portion of the first surface and a portion of the sloped surface collectively define a notch;

the cutting member is a first cutting member, the cutting edge is a first cutting edge, and the body includes a second cutting member disposed within the notch and having a second cutting edge parallel to the front edge;

the actuator assembly includes an actuator having an outward actuator surface and an inward actuator surface, the outward actuator surface defining a depression, the inward actuator surface being coupled to a first end portion of a biasing member, the biasing member having a storage state associated with the storage configuration, the biasing member further having an actuated state associated with the cutting configuration;

a second end portion of the biasing member is substantially opposite the first end portion of the biasing member, the second end portion being coupled to a first magnet; and a second magnet is coupled to the body, the first magnet and the second magnet being configured to magnetically couple the actuator assembly to the body.

* * * * *